Feb. 12, 1929.  
G. E. STEENROD  
WINDMILL  
Filed July 26, 1924
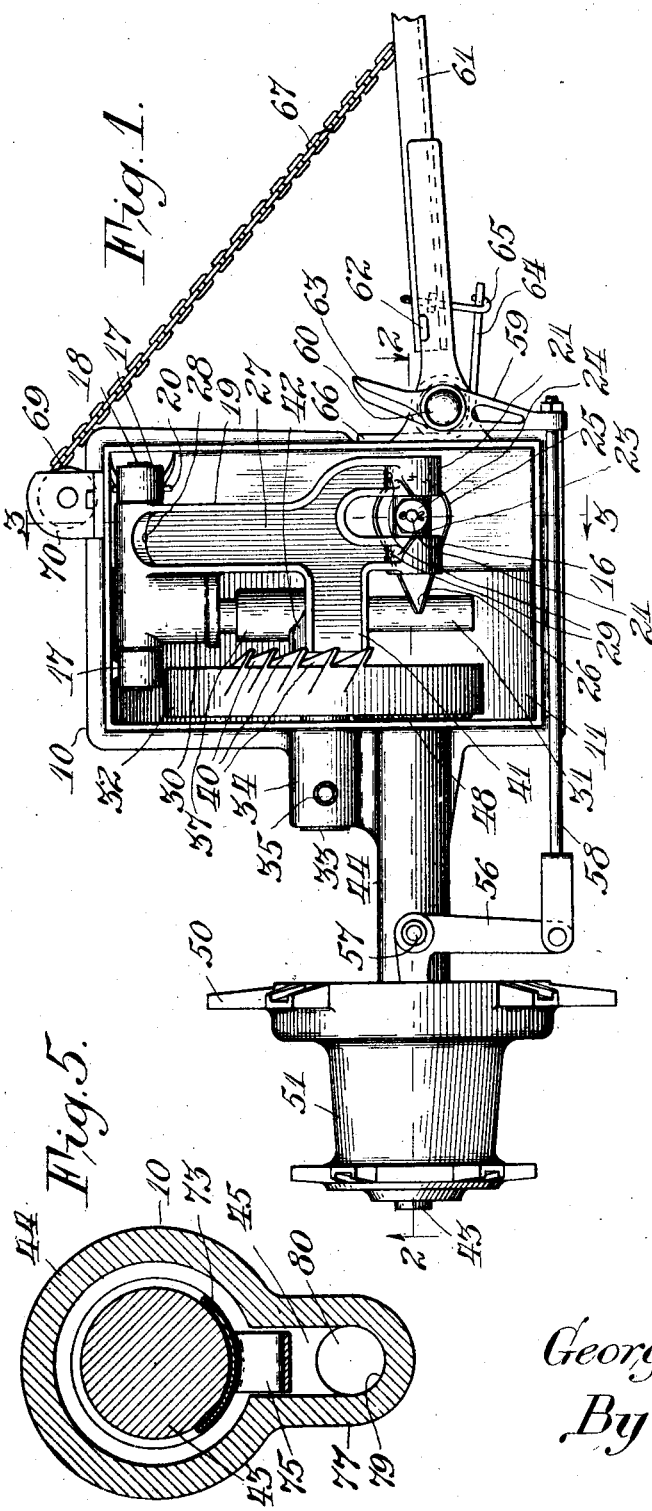
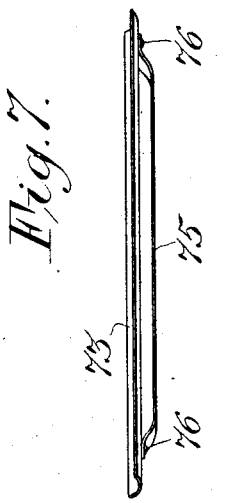
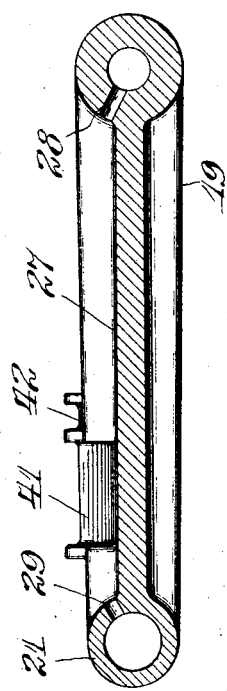
Inventor.  
George E. Steenrod,  
By Sprinkle & Smith  
Attys.

Feb. 12, 1929.
G. E. STEENROD
WINDMILL
Filed July 26, 1924
1,701,512
2 Sheets-Sheet 2
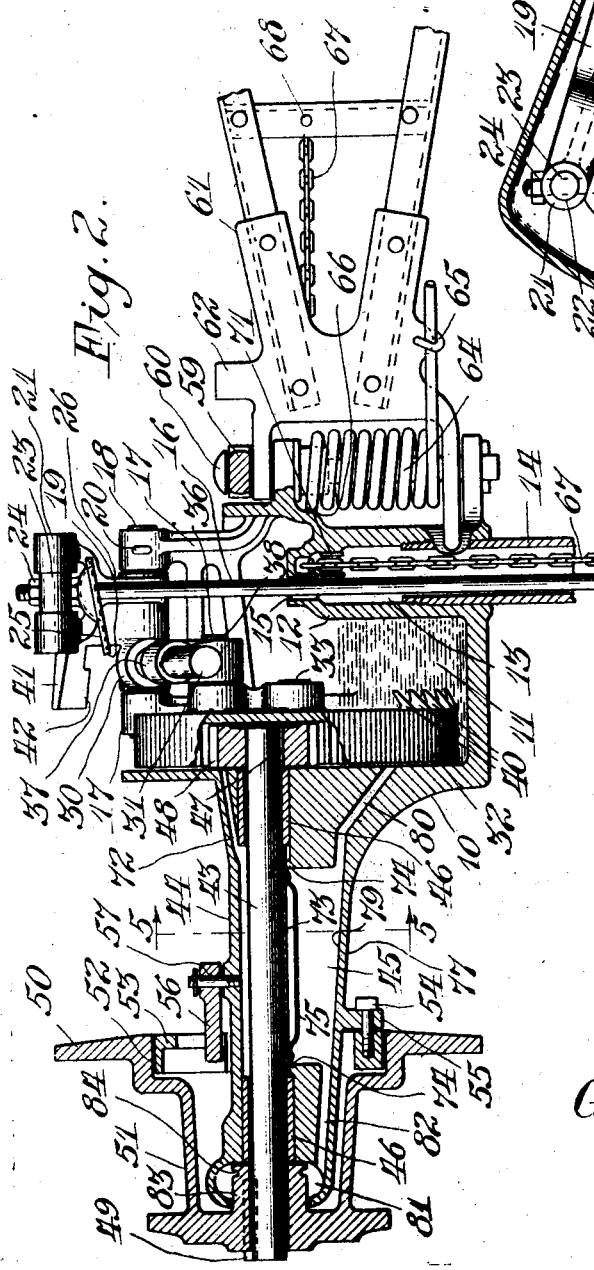
Inventor:
George E. Steenrod,
By Sprinkle & Smith
Attys.

Patented Feb. 12, 1929.

1,701,512

UNITED STATES PATENT OFFICE.

GEORGE E. STEENROD, OF FREEPORT, ILLINOIS, ASSIGNOR TO WOODMANSE MANUFACTURING COMPANY, A CORPORATION OF ILLINOIS.

WINDMILL.

Application filed July 26, 1924. Serial No. 728,295.

This invention relates to a windmill.

One of the objects of the present invention is to provide a generally improved construction of windmill which will facilitate the automatic lubrication of the wearing parts thereof.

A further object of the invention is to provide a simple and novel arrangement of power transmission mechanism which in itself acts as a force feed for automatically supplying a lubricant to the wearing parts.

A still further object of the invention is to provide a novel means for directing the lubricant to the various wearing parts of the windmill structure.

A still further object of the invention is to provide an improved form of lubricant conveying mechanism for conveying the lubricant longitudinally of a shaft.

A still further object of the invention is to provide a generally improved windmill construction which facilitates the automatic lubrication of the wearing parts thereof and permits the return of all surplus lubricant to the lubricant supply chamber.

These and other objects are accomplished by providing a construction and an arrangement of the various parts in the manner hereinafter described and particularly pointed out in the appended claims.

Referring to the drawings, Fig. 1 is a top plan view of my improved windmill construction with the top of the casing removed.

Fig. 2 is a cross sectional view taken on the lines 2—2 of Fig. 1.

Fig. 3 is a transverse cross sectional view taken on the lines 3—3 of Fig. 1.

Fig. 4 is a perspective view of my improved form of power transmitting mechanism.

Fig. 5 is a cross sectional view taken on the lines 5—5 of Fig. 2.

Fig. 6 is an enlarged longitudinal cross sectional view of the pivoted rocker arm, and Fig. 7 is a perspective view of my improved lubricating conveying device for conveying the lubricant longitudinally of the wind wheel shaft.

In carrying out my invention I have shown the same as comprising a main frame or casing 10 which is preferably semi-circular in cross section and carries a lubricant chamber as shown at 11. The casing 10 is provided with a vertically extending sleeve 12 adjacent one side of the lubricant chamber. The sleeve 12 is preferably formed integrally with the casing and is provided with a relatively large circular bore 13, which is adapted to receive at its lower end in threaded engagement therewith a tubular mast 14. The sleeve 12 is provided, at its upper end, with a relatively small bore 15, which is adapted to reciprocally receive a pump rod 16. Formed integrally with the casing on one side thereof and spaced with respect to each other are two rocker arm supports 17. Pivotally mounted by means of a shaft 18 on the supports 17 is a rocker arm 19. The rocker arm 19 is preferably journaled on the shaft 18, which in turn, is secured in the bearing supports 17 by means of a cotter 20. The free end of the rocker arm 19 is provided with spaced apart bearing portions as shown at 21 having longitudinally aligned bores 22 therein for the reception of a pin 23. The pin 23 is provided with a centrally disposed aperture arranged at right angles with respect to the longitudinal axis of the pin, which is adapted to receive and have secured therein by means of a nut 24 the upper end of the pump rod 16. Positioned on the pump rod 16 just below the pin 23 is a lubricant hood or shield 25. The hood 25 is preferably provided with a centrally threaded bore which is adapted to receive in threaded engagement therewith the upper threaded end of the pump rod 16. The hood or guide 25 is positioned beneath the bearing 21 of the rocker arm 19 so as to be positioned to receive any surplus lubricant delivered to this bearing and convey the excess lubricant by an inclined dripper 26 formed integrally with the hood 25. This dripper 26 extends laterally in a direction away from the pump rod 16 and directs the surplus lubricant into the lubricant supply chamber.

By positioning the hood in the manner above described it will be noted that the lubricant is prevented from dripping down on the pump rod 16 and is prevented from passing through the aperture 15 in the sleeve 12 and into the mast 14. My improved rocker arm 19 is provided with a lubricant receptacle 27 on the upper side thereof and extends substantially throughout the longitudinal length of the arm. Communicating with the lubricant receptacle 27 for supplying the lubricant to the fixed pivot of the rocker arm 19 on the shaft 18 is a lubricant bore 28. Similarly the bearing portions 21 of the free end of the rocker arm 19 are provided with lubricant bores 29 which communicate with the lubricant receptacle 27 on the rocker arm 19 for supplying the lubricant to the bearing pin 23. Formed integrally with the rocker arm 19 and positioned to one side of and inclined with respect to the arm 19 is a barrel portion 30. The barrel portion 30 is provided with a longitudinal bore which is adapted to have secured therein, in any well known manner, a shaft 31 in the form of a supplemental arm. The supplemental arm 31 and the arm 19 are in relatively fixed positions with respect to each other forming a bell crank. The rocker arm 19 is actuated by an internal gear 32 rotatably mounted on a shaft 33 secured in a socket 34, formed integrally with the casing 10, by means of a set screw 35. The internal gear 32 has one side thereof provided with an eccentrically mounted stud 36. Pivotally mounted on the stud 36 and slidably engaging the shaft or supplemental arm 31 is a sliding connection 37. The sliding connection 37 is provided with a longitudinal bore 38 and a bore 39 arranged at right angles with respect to the bore 38. The sliding connection 37 is mounted on the shaft or supplemental arm 31 by the bore 38 of the connection 37 slidably engaging said shaft. The internal gear 32 is provided on its rear side, and on the side substantially opposite the eccentrically mounted pin 36 with a plurality of lubricating fins 40.

From this construction it will be understood that as the internal gear revolves in the bath of lubricant 11 a substantial amount of the lubricant will adhere to the gear as it revolves therein and as the fins reach their uppermost position the lubricant will be drained or guided off the surface of periphery of the internal gear in a direction to drip the lubricant on an inclined chute 41, which is formed integrally with the rocker arm 19 and guides the lubricant into the receptacle 27 of the rocker arm 19. Positioned to one side of the inclined chute 41 is a relatively smaller chute 42 formed integrally therewith and inclined at a greater angle than that of the chute 41. The chute 42 is positioned to direct and drip the lubricant on the sliding connection 38 and the shaft 31, which is positioned directly below the chute. Formed integrally with the casing 10 and forming a support for the bearings for the wind wheel shaft 43 is a housing 44. This housing 44 is provided with a chamber 45 intermediate its ends. Positioned adjacent the opposite ends of the chamber for rotatably supporting the shaft 43 are babbitt bearing bushings 46. The portion of the shaft 43 between the babbitt bushings 46 is mounted in the chamber 45 of the housing 44 in such a manner that the intermediate portion of the shaft does not contact with the housing. Secured to the inner end of the shaft 43, preferably by a key 47, is a pinion 48, which is in meshing relation with the internal gear 32. Mounted on the outer end of and secured to the shaft 43, preferably by a key 49, is a wind wheel 50. The wind wheel 50 is provided with a hollow hub 51 which overhangs the outer end of the housing, as clearly shown in Fig. 2. Formed integrally with the hub 51 of the wind wheel 50 is an enlarged circular recess 52, which is adapted to receive in operative relation therewith a friction brake 53, which is preferably mounted on a bolt 54 secured to a lug 55 formed integrally on the lower side of the housing 44. This friction brake 53 is actuated by a bell crank 56 pivoted on a pin 57. The bell crank is connected by a connecting rod 58 to a lever 59. The lever 59 is fulcrumed on a pivot 60, which also forms the fulcrum for the wind vane 61. The wind vane 61 is adapted to be swung from its operative position, or the position shown in Fig. 1, to a position in which an upstanding lug 62 of the wind vane 61 contacts with the free end 63 of the lever 59 and through the mechanism of the connecting rod 58 and bell crank 56 actuates the friction brake 53 in a manner well known in the art to lock the wind wheel 50 against rotation. The wind vane 61 is normally actuated to its operative position by a torsional spring 64 which is mounted concentrically on the pin 60 and has one end connected to the wind vane 61 as shown at 65 and the other end thereof contacting with the casing 10 as shown at 66. The wind vane 61 is swung into its inoperative position by a chain 67, one end of which is connected to the wind vane 61 as shown at 68. The chain 67 is trained about a sheave 69 mounted in a bracket 70 secured to one side of the casing and trained about a second sheave 71 mounted within the sleeve 12 adjacent the reciprocating pump rod 16. The other end of the chain 67 extends through the tubular mast 14 and by means of a wire extension extends to a point within easy reach of the operator on the ground for controlling the operation of the wind mill.

Another essential feature of my improved lubricating mechanism resides in positioning the internal gear together with the meshing pinion in such a position that the revolving of these gears co-operate in a manner to produce a force feed action on the lubricant and forces the lubricant to relatively remote wearing points. Communicating with the casing or lubricant chamber 10 is a communicating passageway 72. This passageway 72 inclines downwardly and as the lubricant is forced through the passageway 72 by the action of the gears it is discharged on the revolving shaft 43 where all excess lubricant falls to the base of the chamber 45 of the housing 44. The lubricant is conveyed from the inner bearing to the outer bearing in a direction longitudinally of the shaft by positioning a curved member 73 to contact with the revolving underside of the shaft 43. Both ends of the member 73 are held in position by the outer ends thereof resting on flanges 74 formed integrally with the housing. The member 73 is reinforced and strengthened by a bail 75 which has its outer ends secured to the member 73 by rivets 76. The bail 75 performs the further function of preventing the curved member 73 from rotating with the shaft 43. The bail 75 of the curved member 73 is positioned in the chamber 45 which is formed by a downwardly projecting extension 77 formed as an integral part of the housing 44. This bail is adapted to engage the side of the chamber 45 and prevent the rotation of the curved member 73 by the action of the shaft 43. (See Fig. 5.) As the lubricant is forced through the passageway 72 in the housing 44 by the pump-like action of the pinion 48 and internal gear 32, the lubricant is discharged on the shaft 43 at a point adjacent the outer end of the inner bushing 46. Here the lubricant is spread over the shaft and as the shaft revolves the curved member 73 advances the lubricant in a direction toward the outer end of the shaft and serves as a bridge for conveying and advancing the lubricant toward the outer end of the shaft and thereby lubricating the outer bearing or bushing 46 of the shaft. It will, of course, be understood that all surplus lubricant will flow down the inclined base or bottom 79 of the chamber 45 and is returned to the main supply chamber 11 of the casing 10 by a passageway 80 which places the chamber 45 and the lubricant supply chamber 11 in communication with each other. Any excess or surplus lubricant passing through the outer end of the outer bushing 46 will be discharged in an annular chamber 81 formed in the outer end of the housing 44. This surplus lubricant chamber communicates with the chamber 45 by an inclined passageway 82, thus permitting the return of any surplus lubricant to the supply chamber 11 of the casing 10. In order to prevent the further possibility of lubricant being discharged between the wind wheel 50 and the end of the housing 44 I have provided an inner hub 83 which is formed integrally with the hub 51 of the wheel 50 and is adapted to fit within the chamber 81 of the housing 44. This inner hub is provided with a peripheral groove 84, which discharges the lubricant into the chamber 81 of the housing 44 and thereby prevents the lubricant from advancing along the hub 83 where it might be discharged into the outer hub 51.

From the above description it will be readily seen that when the wind vane 61 is thrown into its operative position the wind will cause the wind wheel 50 to rotate in a clockwise direction (when looking at the windmill from the direction of Fig. 3) and that as the wind wheel is driven in the clockwise direction the pinion 48 meshes with the internal gear 32 and causes the gear to rotate in the bath of lubricant 11 in the casing 10, which, in turn, through the sliding connection 37 will actuate the rocker arm 19 on the shaft 18 as its pivot. The actuation or oscillation of the rocker arm 19 will cause a reciprocation of the pump rod 16 for pumping the water. As the gear 32 revolves in the bath of lubricant 11 in the chamber 10 a quantity of the lubricant adheres to the surface and periphery of the internal gear and as the gear reaches the position in which the inclined fins 40 reach substantially their uppermost position they will deflect and cause the lubricant to be dripped off their pointed ends onto the inclined chute 41, which, in turn, directs the lubricant into the receptacle 27 of the rocker arm 19. When sufficient lubricant is accumulated in the receptacle 27 the lubricant will flow into the lubricant bores 29 for lubricating the pivotal connection of the pump rod 16 and the free end of the rocker arm 19. Similarly, the lubricant will flow from the receptacle 27 into the lubricating bore 28 and lubricate the fixed pivot of the rocker arm 19 on the shaft 18. The sliding connection 37 together with its pivotal mounting on the stud 36 is lubricated when the eccentric stud 36 is dipped into the lubricant bath 11 on its lowermost stroke or, in other words, when the power transmitting mechanism assumes the position shown in Fig. 4 the sliding connection 37 together with the shaft 31 will be practically submerged in the lubricant bath.

As previously pointed out, I have so arranged my gear mechanism with respect to the wind wheel shaft and lubricant supply chamber that these gears co-operate with my improved arrangement in such a manner that they act as a force feed for furnishing lubricant to the bearing of the wind wheel shaft. In other words, as the internal gear 32 revolves in a clockwise direction (see Fig. 3) the teeth of the gear 32 form cups and elevate the lubricant on the upwardly moving side of the gear, and as the teeth of the pinion engage the teeth of the internal gear the lubricant is forced under pressure out of the recesses between the teeth of the internal gear and forces the lubricant in all directions, and by reason of the position of the opening 72 with respect to the pinion 48 and gear 32 the lubricant is forced under pressure through this passageway 72 for supplying lubricant to the wind wheel shaft 43. As the lubricant is discharged onto the shaft 43 through the passageway 72 it is advanced along the shaft 43 to its outer end thereof by the curved member 73, and thereby supplies the lubricant for lubricating the outer bearing 46 of the shaft 43. As previously pointed out, all excess lubricant being fed to the various bearings is returned to the main lubricant supply chamber 11 where it is again fed by the same process to each of the bearings.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letter Patent is:

1. In a windmill, the combination with a hollow metallic frame adapted to carry on the interior thereof a supply of lubricant, an arm pivoted within said frame, a pump rod reciprocally mounted within said frame and connected to the free end of said arm, the said pump rod entering the said frame through a downwardly open sleeve connected with the frame, said sleeve having an opening near the top thereof to permit the entry of the pump rod into the casing above the bottom of the casing, thereby permitting a supply of lubricant within the casing to be maintained if desired to the level of the top of the sleeve, power transmitting mechanism including a toothed gear operatively connected with said arm and rotatably mounted in said casing, the said gear being provided with a plurality of peripherally spaced inclined fins cast integrally on and projecting laterally from the side of said gear, there being oil grooves or ducts formed in the upper side of the said pivoted arm for conveying lubricant to the respective bearings connecting said arm with said frame and said pump rod, and a lubricant collecting chute carried by said pivoted arm in a position to receive the drip of lubricant from said fins during the rotation of the said gear when the said fins are carried to the upper periphery of the gear.

2. In a windmill, the combination with a frame, of a lubricant supply casing carried by said frame, an arm pivoted to said frame, a pump rod reciprocally mounted in said frame and pivotally connected to the free end of said arm, and power transmitting mechanism including a gear and a sliding connection associated therewith for operatively driving said arm, said gear mounted in said casing and adapted to rotate in the lubricant in said casing, whereby the sliding connection carried by said gear is moved through the lubricant in said casing on each revolution of said gear.

3. In a windmill, the combination with a frame, of a lubricant supply casing carried by said frame, an arm pivoted to said frame, a pump rod reciprocally mounted in said frame and pivotally connected to the free end of said arm, a supplemental arm connected with said first mentioned arm, a power transmitting mechanism including a gear, and a connecting member pivotally related to said gear and slidingly connected to said supplemental arm for operatively driving said first mentioned arm, said gear mounted in said casing and adapted to rotate in the lubricant therein, whereby the sliding connection between the gear and said supplemental arm is moved through the lubricant in said casing.

4. In a windmill, the combination with a frame, of a lubricant supply casing formed integrally with said frame, an arm pivoted to said frame, a pump rod reciprocally mounted in said frame and pivotally connected to the free end of said arm, a supplemental arm connected with said first named arm and disposed at an angle with respect thereto, a power transmitting mechanism including a gear operatively connected to said supplemental arm by means of a sliding connection for operating said first named arm, and means including a plurality of fins carried by said gear for conveying the lubricant to the pivotal connections of said first named arm and to said sliding connection.

5. In a windmill, the combination with a frame, of a lubricant supply casing formed integrally with said frame, an arm pivoted to said frame, a pump rod reciprocally mounted in said frame and pivotally connected to the free end of said arm, a supplemental arm connected with said first named arm and disposed at an angle with respect thereto, a power transmitting mechanism including a gear operatively connected to said supplemental arm by means of a sliding connection for operating said first named arm, and means whereby said sliding connection is lubricated by substantially submerging said sliding connection in the lubricant in said casing on each cycle of operation of said gear.

6. In a windmill, the combination with a frame, of a lubricant supply casing formed integrally with said frame, an arm pivoted to said frame, a pump rod reciprocally mounted in said frame and pivotally connected to the free end of said arm, a supplemental arm connected with said first named arm and disposed at an angle with respect thereto, a power transmitting mechanism including a gear operatively connected to said supplemental arm by means of a sliding connection for operating said first named arm, means whereby said sliding connection is lubricated by substantially submerging said sliding connection in the lubricant in said casing on each cycle of operation of said gear, and means including a plurality of fins carried by said gear for conveying the lubricant from said casing to the pivotal connections of said first named arm.

7. In a windmill, the combination with a frame, of a lubricant supply chamber formed integrally with said frame, an arm pivoted to said frame and having a lubricant receptacle formed therein, power transmitting mechanism mounted on said frame and adapted to rotate in the lubricant in said chamber, a pump rod reciprocally mounted in said frame and pivotally connected to the free end of said arm, means including a sliding connection for transmitting the power from said gear to said arm, and laterally projecting fins carried by said gear and adapted to be submerged on each rotation of the gear for conveying the lubricant to the receptacle formed in said arm and to said sliding connection.

8. In a windmill, the combination with a frame, of a lubricant supply chamber formed integrally with said frame, an arm pivoted to said frame and having a lubricant receptacle formed therein, power transmitting mechanism mounted on said frame and adapted to rotate in the lubricant in said chamber, a pump rod reciprocally mounted in said frame and pivotally connected to the free end of said arm, a supplemental arm connected with said first mentioned arm, a sliding connection operatively connecting said supplemental arm with gear, and laterally projecting inclined fins formed on said gear for conveying the lubricant to the receptacle of said first mentioned arm and to said sliding connection.

9. In a windmill, the combination with a frame, of a lubricant supply casing formed integrally with said frame, a housing formed integrally with said frame and casing, a wind wheel shaft journalled in said housing, a pinion secured to the inner end of said shaft and positioned in said casing, and a gear mounted on said frame in a manner to traverse said lubricant supply casing and positioned in operative relation with said pinion in said casing, said housing having a passageway communicating with said casing whereby the rotation and cooperation of said gear and pinion serve to force the lubricant through said passageway to lubricate the bearing of said shaft.

10. In a windmill, the combination with a frame, of a lubricant supply casing formed integrally with said frame, a housing formed integrally with said frame and casing, a wind wheel shaft journalled in said housing, a pinion secured to the inner end of said shaft and positioned in said casing, a gear mounted on said frame in a manner to traverse said lubricant supply casing and positioned in operative relation with said pinion in said casing, said housing having a passageway communicating with said casing and positioned adjacent the point of engagement of said gear and pinion whereby the rotation of said gear and pinion serve to force the lubricant through said passageway to lubricate the bearing of said shaft, and means for conveying the lubricant longitudinally of said shaft.

11. In a windmill, the combination with a frame, of a lubricant supply casing formed integrally with said frame, a housing formed integrally with said frame and casing, a wind wheel shaft journalled in said housing, a pinion secured to the inner end of said shaft and positioned in said casing, a gear mounted on said frame and positioned in operative relation with said pinion in said casing, said housing having a passageway communicating with said casing whereby the rotation and meshing of said gear and pinion serve to force the lubricant through said passageway to lubricate the bearing of said shaft, and means supported beneath said shaft for conveying the lubricant longitudinally of said shaft and housing, said housing having means formed therein adjacent said bearing and communicating with said supply casing for returning surplus lubricant from the bearing to said casing.

12. In a windmill, the combination with a frame, of a lubricant supply casing formed integrally with said frame, a housing formed integrally with said frame and casing, a wind wheel shaft journalled in said housing, a pinion secured to the inner end of said shaft and positioned in said casing, a gear mounted on said frame and positioned in operative relation with said pinion in said casing, said housing having a passageway communicating with said casing whereby the rotation of said gear and pinion serve to force the lubricant through said passageway to lubricate the bearing of said shaft, and means extending longitudinally of and beneath said shaft for conveying the lubricant longitudinally of said shaft and housing, said housing having additional passageways formed therein and communicating with said bearing and supply casing for returning surplus lubricant from the bearing to said casing.

13. In a windmill, the combination with a frame, of a lubricant supply casing formed integrally with said frame, a housing formed integrally with and extending laterally from said casing, spaced apart bearing members mounted in said housing, a wind wheel shaft journalled in the bearing members of said housing, a pinion secured to the inner end of said shaft and positioned in said casing, a gear journalled in said casing and operatively related to said pinion, there being a lubricant pasageway formed in said housing and communicating with said casing, said gear being positioned to rotate in the lubricant in said casing and co-operating with said pinion whereby the rotating action of said gear and pinion forces the lubricant through said pasageway for lubricating said spaced apart bearings in said housing.

14. In a windmill, the combination with a frame, of a lubricant supply casing formed integrally with said frame, a housing formed integrally with and extending laterally from said casing, spaced apart bearing members mounted in said housing, a wind wheel shaft journalled in the bearing members of said housing, a pinion secured to the inner end of said shaft and positioned in said casing, a gear journalled in said casing and operatively related to said pinion, there being a lubricant passageway formed in said housing and communicating with said casing, said gear being positioned to rotate in the lubricant in said casing and co-operating with said pinion whereby the rotating action of said gear and pinion forces the lubricant through said passageway, and means extending between said spaced apart bearing members for conveying the lubricant longitudinally of said shaft as said shaft revolves.

15. In a windmill, the combination with a frame, of a lubricant supply casing formed integrally with said frame, a housing formed integrally with and extending laterally from said casing, spaced apart bearing members mounted in said housing, a wind wheel shaft journalled in the bearing members of said housing, a pinion secured to the inner end of said shaft and positioned in said casing, a gear journalled in said casing and operatively related to said pinion, there being a lubricant passageway formed in said housing and communicating with said casing, said gear being positioned to rotate in the lubrcant in said casing and co-operating with said pinion whereby the rotating action of said gear and pinion forces the lubricant through said passageway, and a curved member positioned in close proximity to said shaft and between said spaced apart bearing members for conveying the lubricant longitudinally of said shaft as said shaft is revolved.

16. In a windmill, the combination with a frame, of a lubricant supply casing formed integrally with said frame, a housing formed integrally with and extending laterally from said casing, spaced apart bearing members mounted in said housing, a wind wheel shaft journalled in the bearing members of said housing, a pinion secured to the inner end of said shaft and positioned in said casing, a gear journalled in said casing and operatively related to said pinion, there being a lubricant passageway formed in said housing and communicating with said casing, said gear being positioned to rotate in the lubricant in said casing and co-operating with said pinion whereby the rotating action of said gear and pinion forces the lubricant through said passageway, a curved member positioned in close proximity to said shaft and between said spaced apart bearing members for conveying the lubricant longitudinally of said shaft as said shaft is revolved, and means for preventing the displacement of said curved member.

17. In a windmill, the combination with a frame, of a lubricant supply casing formed integrally with said frame, a housing formed integrally with and extending laterally from said casing, spaced apart bearing members mounted in said housing, a wind wheel shaft journalled in the bearing members of said housing, a pinion secured to the inner end of said shaft and positioned in said casing, a gear journalled in said casing and operatively related to said pinion, there being a lubricant passageway formed in said housing and communicating with said casing, said gear being positioned to rotate in the lubricant in said casing and co-operating with said pinion whereby the rotating action of said gear and pinion forces the lubricant through said passageway, a curved member positioned in close proximity to said shaft and between said spaced apart bearing members for conveying the lubricant longitudinally of said shaft as said shaft is revolved, and a bail secured to said curved member and adapted to engage the walls of said housing for preventing the displacement of said curved member.

18. In a windmill, the combination with a frame, of a lubricant supply casing formed integrally with said frame, a housing formed integrally with and extending laterally from said casing, spaced apart bearing members mounted in said housing, a wind wheel shaft journalled in the bearing members of said housing, a pinion secured to the inner end of said shaft and positioned in said casing, a gear journalled in said casing and operatively related to said pinion, there being a lubricant passageway formed in said housing and communicating with said casing, said gear being positioned to rotate in the lubricant in said casing and co-operating with said pinion whereby the rotating action of said gear and pinion forces the lubricant through said passageway for lubricating said spaced apart bearings in said housing, and a wind wheel secured to the outer end of said shaft, said wheel having a hub provided with a peripheral groove, and an annular chamber formed on the outer end of said housing and substantially embracing said hub collecting surplus lubricant discharged by the groove in said hub.

19. In a windmill, the combination with a frame, of a lubricant supply casing formed integrally with said frame, a housing formed integrally with and extending laterally from said casing, spaced apart bearing members mounted in said housing, a wind wheel shaft journalled in the bearing members of said housing, a pinion secured to the inner end of said shaft and positioned in said casing, a gear journalled in said casing and operatively related to said pinion, there being a lubricant passageway formed in said housing and communicating with said casing, said gear being positioned to rotate in the lubricant in said casing and co-operating with said pinion whereby the rotating action of said gear and pinion forces the lubricant through said passageway, and a curved member bridging the spaced apart bearing members for conveying the lubricant to the outer bearing member.

20. In a pump actuating device, the combination of a hollow metallic casing adapted to contain a supply of lubricant, a rocker arm pivotally mounted therein, a pump rod having pivotal connection with said arm, a hollow sleeve projecting from the bottom of said casing through which said pump rod is adapted to enter the casing, said sleeve being closed except at the top thereof to provide the pump rod opening whereby a quantity of lubricant may be maintained within the casing below the top of the sleeve, a supplemental arm connected with said rocker arm adjacent its pivotal connection with the casing, said supplemental arm being offset from the normal vertical plane of oscillation of the rocker arm and inclined thereto at an angle below the rocker arm whereby the said supplemental arm during its oscillation will pass below the level of the upper end of said sleeve in the bottom of the casing, a rotatable gear, means for rotating said gear, and means pivotally mounted on said gear eccentric thereto and slidably connected with said supplemental arm in a manner to oscillate said rocker arm to reciprocate said pump rod when said gear is rotated.

In testimony whereof I have signed my name to this specification on this 22nd day of July, A. D. 1924.

GEORGE E. STEENROD.